Sept. 7, 1926.

L. A. DE LA NUX ET AL 1,598,960

SELF DISCHARGING CULTIVATOR

Filed March 10, 1925

INVENTORS.
LEON ALBERT DeLaNUX
BY AUGUSTUS P. CANOVA

Munn & Co.,
ATTORNEYS.

Patented Sept. 7, 1926.

1,598,960

UNITED STATES PATENT OFFICE.

LEON ALBERT DE LA NUX AND AUGUSTUS P. CANOVA, OF HONOLULU, TERRITORY OF HAWAII.

SELF-DISCHARGING CULTIVATOR.

Application filed March 10, 1925. Serial No. 14,569.

This invention relates to self discharging cultivators, and has for its primary object the provision of means for causing the collected or accumulated load to be discharged therefrom without the necessity of raising the cultivator as it is moved over the field.

Another object of the invention is to provide a cultivator of the above character including a rotary tooth bar having gangs of teeth adapted to be presented for independent operations successively and means for accelerating the action of operatively effecting presentation of said gangs as the exigency of the occasion demands.

Another object of the invention is to provide a cultivator having a tooth bar which will operate between the rows of cane, corn or the like, whereby the stones, weeds, grass, stalks, etc., will be scooped inwardly to a point toward the center of the space between the rows and swept positively from points away from the rows and finally collected in bunch formation and automatically dumped as the cultivator is continuously drawn across the field.

Other objects and advantages of the invention will be apparent from a consideration of the more detailed description which follows.

In the drawings—

Figure 1:
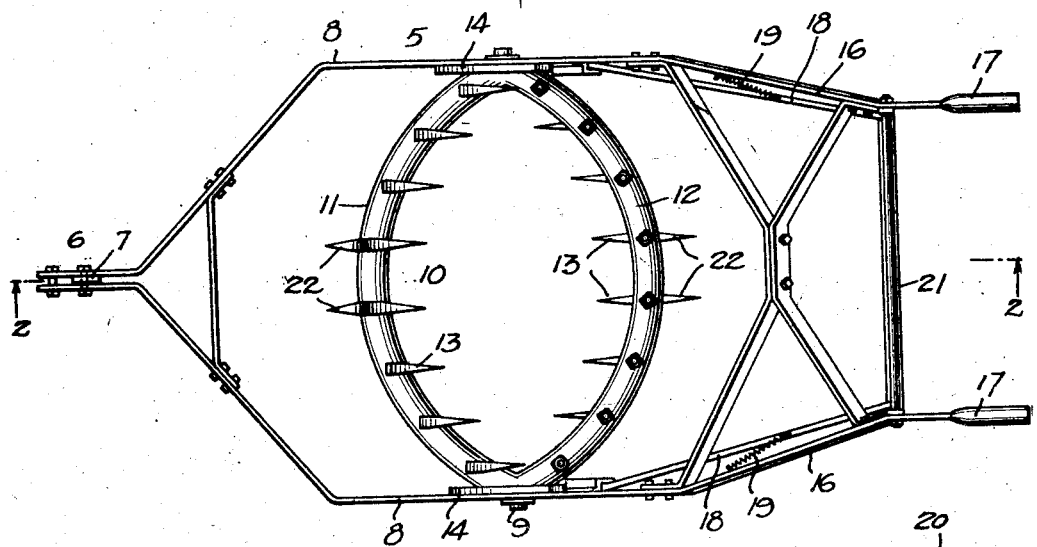
Figure 1 is a plan view of the cultivator.

In carrying the invention into practice, we employ a suitable draft frame 5, the front end of which indicated at 6 and designed so that it can be connected with draft means. At the front end, the frame 5 is provided with a vertically adjustable colter 7 of any suitable well known form.

The frame 5 is provided with parallel spaced apart bars 8—8 in which the trunnions 9 at the respective ends of the transverse axis of an elliptical shaped tooth carrier 10 are journaled for rotation. This carrier presents oppositely bowed or arcuate bars 11 and 12, to each of which is secured a gang of cultivator teeth 13. These bars extend from one side of the frame 5 to the other side thereof, and incident to the arcuate arrangement of the teeth 13 thereon each bar presents a scoop-like structure, which, when the teeth of one of the gangs are in contact with the ground, causes the matter collected to move to a point toward the longitudinal axis of the draft frame and away from the rows. When the carrier is in the horizontal position indicated in Figure 2, the teeth of the bar 12 thereof extend downwardly for effective engagement with the ground and the teeth of the bar 11 extend upwardly above the transverse axis of the carrier.

In order that the carrier 10 can be held firmly in its position of horizontal adjustment, use is made of latch disks 14, the same being secured to the ends of the carrier frame and provided with peripheral keeper recesses 15. Each of these disks is provided with two of said recesses 15 and they are diametrically positioned as shown. The frame 5 has upwardly and rearwardly extending branches 16 which terminate in hand grips 17. Slidable in these branches 16 are dogs 19 which coact with the mating keeper recesses 15 to hold the frame 10 against rotation. These dogs are yieldingly urged to disengaging positions by means of springs 19 carried by said branches 16.

The said dogs 18 are joined at 20 to a swinging releasing bar 21 carried by the branches 16 at a point adjacent to the hand grip 17.

Figure 2:
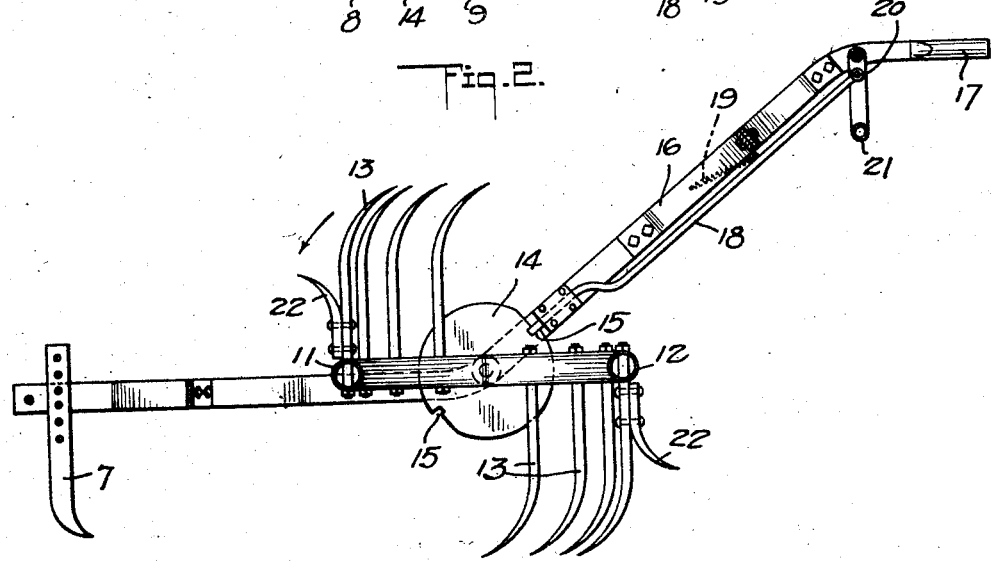
Figure 2 is a longitudinal section therethrough on the line 2—2 of Figure 1.

At the center of each gang of teeth 13, at the rear thereof, is a spur 22 which, when the gang with which it is associated is above the axis of the carrier 10, extends in a curved forward direction, as clearly shown at the left of the carrier in Figure 2.

After the cultivator functions through a desired interval, the dogs 18 are manually released from the latch disks 14 and the whole carrier, as the frame 5 moves forward, turns on its transverse axis so as to dump the load automatically without lifting the machine from the ground. The carrier turns in the direction of the arrow in Figure 2 and the previously active teeth 13 of the rear gang move upward and the teeth 13 of the inactive gang downward. At this moment, the spurs 22 of the front gang engage with the ground so as to take purchase therewith as the frame 5 is propelled forward and thereby cause a complete turning of the carrier about its axis. This operation may take place periodically through the cultivating and collecting period, as may suit the choice of the operator.

We claim:

1. A self discharging cultivator comprising a draft frame, a rotary tooth carrier provided with a plurality of sets of cultivator teeth, the teeth of each set arranged in an arcuate series with one set of teeth normally occupying a position under the draft frame for effective engagement with the ground and the other set above the frame and out of contact with the ground, means for locking the tooth carrier against rotation, and means for unlocking the carrier to permit rotation thereof.

2. A self discharging cultivator comprising a draft frame, a rotary tooth carrier provided with a plurality of sets of cultivator teeth, the teeth of each set arranged in an arcuate series with one set of teeth normally occupying a position under the draft frame for effective engagement with the ground and the other set above the frame and out of contact with the ground, means for locking the tooth carrier against rotation, means for unlocking the carrier to permit rotation thereof, and means for accelerating the action of rotation of the carrier when unlocked.

3. A self discharging cultivator comprising a draft frame, a rotary tooth carrier provided with a plurality of sets of cultivator teeth, the teeth of each set arranged in an arcuate series with one set of teeth normally occupying a position under the draft frame for effective engagement with the ground and the other set above the frame and out of contact with the ground, means for locking the tooth carrier against rotation, means for unlocking the carrier to permit rotation thereof, and ground engaging means on the carrier for urging rotation thereof when the carrier is unlocked.

4. A self discharging cultivator comprising a draft frame, a rotary tooth carrier mounted on the frame, said carrier being of elliptical form, with the vertices of its transverse axis journaled for rotation in the frame, respectively oppositely extending sets of teeth on the carrier, and means for successively presenting said sets of teeth for effective contact with the ground.

5. A self discharging cultivator comprising an ellipsoidal-rotary-tooth carrier presenting two tooth mounting surfaces, a set of teeth extending in one direction from one surface, a set of teeth extending in an opposite direction from the other said surface when the carrier is held relatively rigid, and a mounting for said carrier to permit same to be moved over the ground so that at least one set of said teeth may be actively presented in arcuate formation to the ground and thereby cause matter collected by the teeth of either set to move from the ends of set to points near the center thereof.

6. A sugar cane cultivator adapted to be drawn between parallel rows of cane and comprising a draft frame, a rotary tooth carrier mounted on the frame and being of elliptical form, sets of oppositely extending teeth carried by the frame and arranged in arcuate series, the teeth of each set adapted for alternate engagement with the ground, so that the matter disturbed and collected by the teeth will move to a point on the ground medially of the space between the adjacent rows of cane during the cultivating operation and means for locking the toothed carrier against rotation.

7. A sugar cane cultivator comprising a draft frame adapted to be drawn between parallel rows of cane, a rotary carrier supported on the frame, cultivator teeth oppositely disposed on the carrier and arranged in arcuate series so that the matter disturbed and collected by the alternate series of teeth will move to a point on the ground medially of the space between the adjacent rows of cane during the cultivating operation, and means for locking the rotary carrier against rotation.

LEON ALBERT de la NUX.
AUGUSTUS PIANA CANOVA.